3,349,568
METHOD OF AND APPARATUS FOR FOAMING IN PLACE UNDERGROUND CONDUIT
Hubert S. Smith, Essexville, and Eugene Ulmanis, Midland, Mich., assignors to The Dow Chemical Company, Midland, Mich., a corporation of Delaware
Filed Oct. 8, 1964, Ser. No. 402,573
9 Claims. (Cl. 61—72.2)

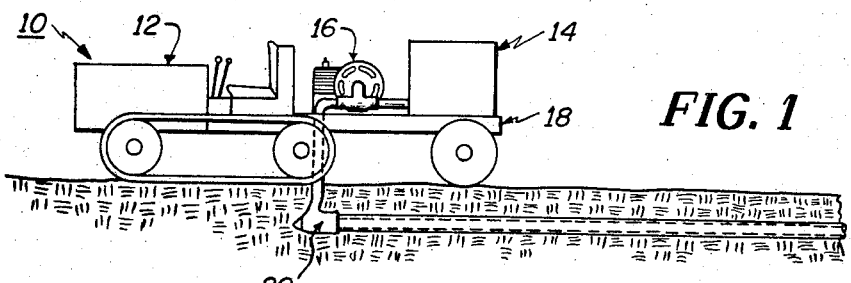
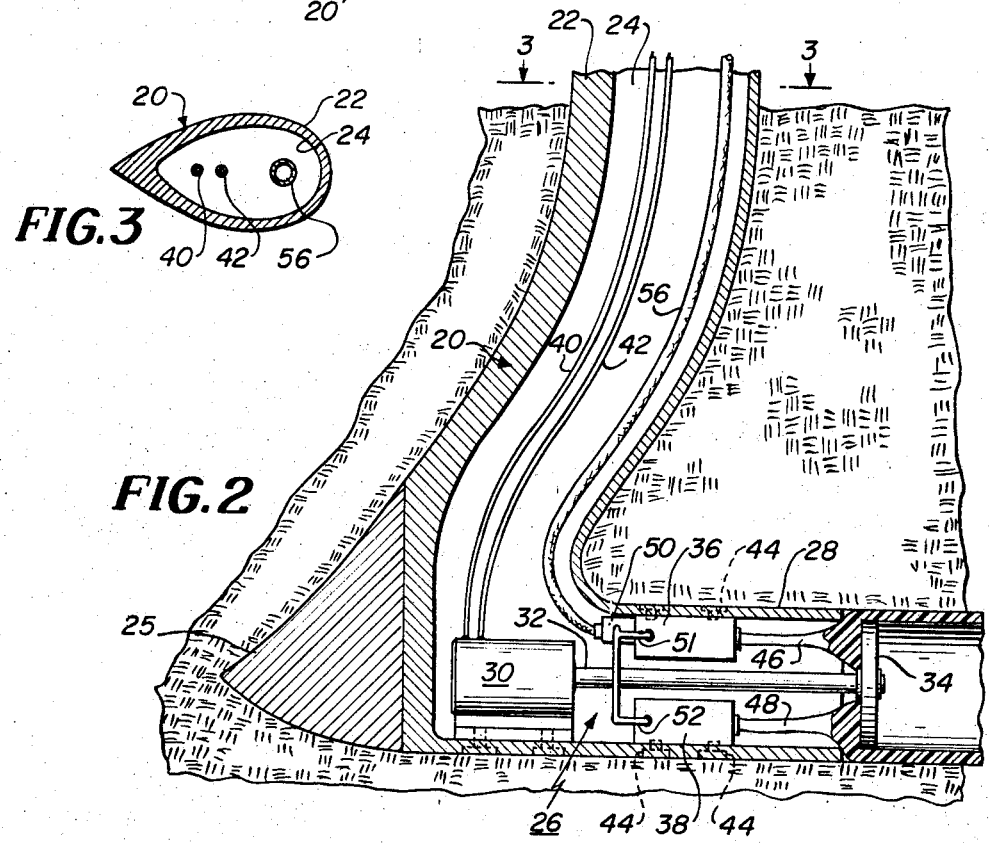
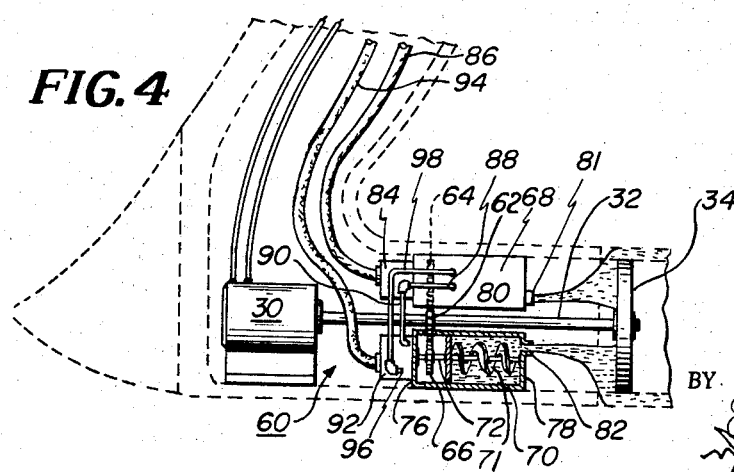

This invention relates to a machine and method for installing plastic pipe underground in an integrated operation, to form a continuous length pipe.

Prior to the present invention, a machine and method for extruding thermoplastic foam producing material to form a continuous length pipe has been known. Briefly, the prior method included the steps of forming a trough-like hole in the ground with a plow assemblage attached to a tractor; extruding from the rear end of the plow assemblage, a quick setting plastic foam in the form of a pipe, into the hole as the plow assemblage is moved along; and automatically back filling the hole by action of the unsupported ground which was momentarily displaced by the plow assemblage. A series of slots were formed in the pipe, to serve as drainage ports for water intake, when the pipe was to be used for drainage purposes. However, formation of such ports were eliminated when the pipe was to be used for liquid carrying purposes, or when used as a sheathing for underground power lines, or piping. A machine used to perform the prior method was self-contained, insofar as it was adapted to carry and mix the ingredients used to form the plastic pipe.

The present invention contemplates a machine and method utilizing reactive liquid foam producing plastic resin materials instead of thermoplastic foam producing materials. The cost advantages inherent in a foam plastic pipe are thereby gained and the equipment and control requirements are greatly simplified.

The general process can be applied to many reactive plastic foam producing materials such as chloromethylated diphenyl oxide (CMDPO), epoxies, urethanes, polyesters, phenol formaldehyde and the like. The different raw materials require different reaction activation techniques, however, the general principle is essentially the same. As an example, the CMDPO material requires heat activation while the urethanes require intimate mixing of two reactant materials prior to the formation of a polymerized plastic foam.

Accordingly, it is an object of the invention to provide an improved method of installing underground piping.

It is a further object to provide a machine and method for laying a continuous length plastic pipe underground in an efficient manner, which affords great economies.

It is a further object of the invention to provide a machine and method for laying a continuous length plastic pipe underground, which pipe may be arranged to carry run-off ground water, or used for conveying liquids, or as a sheathing for power lines, etc.

It is a still further object to provide a machine and method for installing underground pipe in an integrated operation, including formation of a trench, forming, in an appropriate manner, a plastic pipe utilizing reactive liquid foam producing plastic resin materials in the bottom of the trench, and back filling the trench.

Other objects of the invention will in part be obvious and will in part appear hereinafter.

The above mentioned objectives are generally accomplished in the following manner. Reactive plastic foam producing material is held in a suitable reservoir above ground on a power unit or towed implement. The material is pumped under pressure, at a rate controlled by the speed of hole formation and the dimensions of the pipe, through a passageway in a support member which has a hole forming device secured therein. The material is activated and expelled through an orifice which directs the flow of the foamed plastic material to a rapidly rotating distributor disk which, by centrifugal force, throws it out to the surface of the hole which has just been formed. In the case of resins which require thermo-energy to activate them, the thermo-energy for activating the matetrial can be provided by several methods. For example, the rotating distributor disk can be heated; a heating chamber can be located before the exit orifice; or a dielectric heating field between the orifice and the rotating disk can be produced. In the case of materials such as urethanes which require intimate mixing of two reactant materials, suitable mixing chambers are provided to mix them to form a polymerized plastic foam. A series of slots may be formed in the pipe, to serve as drainage ports for water intake, when the pipe is to be used for drainage purposes.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

FIGURE 1 is a view illustrating apparatus embodying principles of the invention and showing the same in operative condition;

FIGURE 2 is an enlarged sectional view through a plastic pipe forming and laying plow assemblage as used in the apparatus illustrated in FIG. 1;

FIGURE 3 is a sectional view generally as seen along lines 3—3 in FIG. 2; and

FIGURE 4 is a view illustrating a distributor driving motor and mixer means exemplary of appartaus which may be used to intimately mix two reactant materials.

Similar reference characters refer to similar parts throughout the several views of the drawing.

Referring now to the drawing, apparatus exemplary of the present invention is generally represented by the numeral 10 and includes a caterpillar tractor 12, or equivalent motorized prime mover, a reservoir 14 and a pump 16, both of which are mounted on a trailer attachment 18 which is towed by the caterpillar tractor 12, and a plastic pipe forming and laying plow assemblage 20 which is secured to the trailer 18. Plow positioning means (not shown) are provided to lower and raise the plow assemblage 20, so that a continuous pipe forming operation may be performed in the ground at depths of 30" to 54". Such plow positioning means may be arranged to provide a desired slope to the laid pipe when the latter is used for drainage purposes.

The plow assemblage 20 comprises an elongated outer casing 22 which is formed to provide a tubular passageway 24 through which a plurality of feed lines can be extended to the plastic pipe forming apparatus 26 arranged within the horizontally extending end portion 28 of the plow assemblage 20. At the lower forward end of the outer casing 22 is a pointed tip 25 which serves to plow or otherwise form a circular passageway in the ground as the plow assemblage 20 is moved therethrough. It will be noted that the shape of the casing 22 in the region above the tip 25 is somewhat tear-shaped with the lead end of the sharper configuration, as best seen in FIG. 3, so that the resistance to the plow assemblage 20 will be minimized as it is moved through the ground. Accordingly, the exterior shape of the tip 25 and the lower end portion 28 of the outer casing 22 will undergo a transition to accommodate change of shape from a tear drop to a circular passageway.

The plastic pipe forming apparatus 26, in the case of reactant materials which are activated by means of thermo-energy, generally comprises a distributor driving motor 30 which has a shaft 32 which extends slightly beyond the end of the end portion 28 of the plow assemblage 20 so that a rotating distributor disk 34 which is connected to the shaft 32 is positioned immediately adjacent the end of the end portion 28. Conductors 40 and 42 connect the motor 30 to a suitable energizing source (not shown) for energizing it. A pair of heating chambers 36 and 38 having heating coils preferably of the electrical resistance type are secured to the outer casing 22 by means of fastener means, such as the threaded screws 44. Nozzles 46 and 48 are connected, respectively, to the heating chambers 36 and 38 and are arranged to expel the reactant material on the distributor disk 34. A valve 50 having feed lines 51 and 52 to the heating chambers 36 and 38, respectively, controls the flow of the reactants thereto. Also, suitable by-pass circuits (not shown) are located at the pump 16, for returning the reactant material to the reservoir when the valve 50 is closed. The retactant material is supplied from the pump 16 to the valve 50, and hence to the heating chambers 36 and 38, by means of the feed line 56.

In operation, the plow assemblage 20 is lowered into the ground at a desired depth to form a trough as the tractor 12 is driven forward. At the desired depth of the trough, the pump 16 is operated to draw the reactant plastic material from the reservoir 14 and to pressurize the material to force it through the feed line 56 in the passageway 24 of the plow assemblage 20 to the valve 50. The valve 50, when opened, functions to evenly distribute the reactant material to the heating chambers 36 and 38. The rate at which the pump 16 draws and pressurizes the material is governed by the speed of hole generation, the size of the hole, the wall thickness desired, and the foam density. The reactant which may be, for example, CMDPO, is heated in the heating chambers 36 and 38 to the reaction activation temperature by means of the heating coils which encircle the same, and is then forced from the heating chambers 36 and 38 through the nozzles 46 and 48 which respectively direct the flow of reactants to the distributor disk 34. The distributor disk 34 is constantly rotated by means of the distributor driving motor 30 and, by centrifugal force, throws the reactants to the surface of the hole which is formed by the plow assemblage 20.

In the case of a plastic pipe formed using CMDPO, the minimum activation temperature is approximately 60° C. and the foam producing reaction time is approximately 10 seconds. Flow rate for 3" outer diameter pipe having a ½" wall thickness, foam density 1.5 lbs. per foot cubed and a speed of 100 lineal feet per minute is 4.1 lbs. per minute.

A series of horizontal slots may be formed in the plastic pipe, to serve as drainage ports for water intake, by securing a mandrel or the like which has a pair of wheel assemblies therein that engage the side wall of the plastic pipe to form the slots. In this respect, the mandrel and wheel assemblies may be the same as or similar to the mandrel and wheel assemblies disclosed in U.S. Patent 3,230,722 issued Jan. 25, 1966 to Coulter et al. The mandrel is affixed to the end of the shaft 32 so that it would not rotate with the shaft. If a plastic foam material having open cell characteristics is used, the slots may be dispensed with, for the water can seep through the open cells of the plastic material so that the drainage ports are automatically provided in the material.

In FIG. 4 is shown an alternate pipe forming apparatus 60 which is used when using reactant materials which require intimate mixing prior to the formation of a polymerized plastic foam. The pipe forming apparatus of FIG. 2 and the pipe forming apparatus of FIG. 4 may be both constructed as complete units so that one or the other may be easily substituted, depending upon the type of material being used.

The pipe forming apparatus 60 utilizes the same distributor driving motor 30, shaft 32 and distributor disk 34. The shaft 32 in this case, however, has a gear 62 secured thereto which functions to drive a pair of gears 64 and 66 positioned within mixing chambers 68 and 70, respectively. The gear 66 is secured to a shaft 72 rotatably secured to the end walls 76 and 78 and the partition wall 80 so that the shaft 72 is rotated as the gear 66 is rotated. Secured to the shaft 72 is a mixer, such as the screw-type auger conveyor 71, which functions to intimately mix the two reactant materials fed to the mixing chamber 70 and to force the same out of the nozzle 82 secured to the end wall 78 thereof so that the material is expelled onto the distributor disk 34. The distributor disk 34, by centrifugal force, throws the reactants to the surface of the hole which has been formed. The mixing chamber 68 is constructed and functions in the same manner as the mixing chamber 70.

A valve 84 is fed a first reactant material by means of the feed line 86 which is connected to the pump 16 and evenly distributes the reactant material to the mixing chambers 68 and 70 by means of the feed lines 88 and 90. A second valve 92 is fed a second reactant material by means of the feed line 94 which is connected to a second pump, which may be similar to the pump 16, and evenly distributes the second reactant material to the mixing chambers 68 and 70 by means of the feed lines 96 and 98. The trailer attachment 18, accordingly, in addition to the reservoir 14 and pump 16 is correspondingly provided with a second reservoir and a second pump for supplying the second reactant material to the pipe forming apparatus 60.

The operation of the apparatus, as previously described, is as follows: the plow assemblage 20 is lowered into the ground at a desired depth to form a trough as the tractor 12 is driven forward. At the desired depth of the trough, the pumps are operated so that a predetermined quantity of the two reactant materials is fed, through the corresponding feed lines 86 and 94 to the mixing chambers 68 and 70. The screw type augers therein are rotated through the medium of the gear 62 secured to the shaft 32, the latter of which is, in turn, driven by the motor 30 so that the reactant materials are mixed and forced out through the nozzles 81 and 82. The mixed reactant material is expelled onto the distributor disk 34 which, as previously stated, by centrifugal force, throws the reactants to the surface of the hole which has been formed by the plow assemblage 20 to form a continuous length plastic pipe.

In both of the above described methods, as the pipe is formed, the ground which has been plowed, or pushed aside by the plow assemblage during forward movement thereof, will re-fill the trough above the plastic pipe. It will be understood, of course, that any underground obstruction, such as large rocks, etc., will present a hazard toward successful operation, as in the case of any plowing operation. However, it will be well within the skill of those competent in the art, to design the plow assemblage 20, so that it is adequate for ordinary and expected plowing conditions. Toward this end, the pointed tip 25 may be arranged for easy installation and removal, as required for normal wear and breakage.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. Apparatus for laying plastic pipe underground comprising, in combination: a power driven vehicle with a plow assemblage thereon for forming a passageway underground at a desired distance from the ground surface and having a substantially circular cross-section, said plow assemblage having at a lower extremity a pointed forward end and a horizontally extending tubular end portion; chemical reactant feed means on said vehicle, activator means included in said lower extremity in communication with said feed means for activating a chemical reactant to form a plastic material which foams; emitting means communicating with said activator means, distributor means outwardly of said tubular end portion and transverse thereof to uniformly distribute said plastic material laterally outwardly against the walls of said circular passageway which is formed as said plow assemblage is driven through the ground, and means for conveying said foamed plastic material from said activator means to said distributor means.

2. The apparatus of claim 1 wherein said distributor means comprises a rotatable distributor disk for throwing, by centrifugal force, said plastic material against said walls of said circular passageway.

3. The apparatus of claim 1 wherein said vehicle has a reservoir means in communication with said chemical reactant feed means on said vehicle for storing a chemical reactant which when activated by heat forms a plastic material which foams.

4. The apparatus of claim 1 wherein said activator means comprises, a heating chamber having heating coils included in said lower extremity for supplying thermo-energy to activate said reactant; valve means for controlling the flow of said reactant from said reservoir means to said heating chamber; and pump means on said vehicle connected to said reservoir means and said valve means for conveying said reactant to said valve means.

5. The apparatus of claim 1 wherein said vehicle has a reservoir means in communication with said chemical reactant feed means on said vehicle for storing chemical reactants which are activated by intimate mixing thereof to form a plastic material which foams.

6. The apparatus of claim 1 wherein said activator means comprises, at least one mixing chamber in said lower extremity for mixing said reactants, said mixing chamber including a shaft, a screw-type mixer secured to said shaft and a gear secured to said shaft for rotating said shaft; valve means for controlling the flow of said reactants to said mixing chamber; and pump means on said vehicle connected to said reservoir means and said valve means for conveying said reactants to said valve means.

7. A method for laying a plastic pipe underground with a power driven vehicle having a plow assemblage thereon comprising the steps of, forming with said plow assemblage a trough and a tubular passageway in the ground, the lower portion of said passageway being at a desired distance from the ground surface; feeding a chemical reactant from above ground to the tubular passageway and activating said chemical reactant to form a plastic material which foams; simultaneously emitting and distributing said plastic material to uniformly coat the tubular passageway and back-filling said trough above said formed plastic pipe with ground which was displaced during trough formation.

8. The method of claim 7 wherein said activating is performed by means of thermo-energy which causes said chemical reactant to form said plastic material which foams.

9. The method of claim 7 wherein said activating is performed by intimately mixing two reactants which, when admixed, produce said plastic material which foams.

References Cited
UNITED STATES PATENTS

| | | | |
|---|---|---|---|
| 1,303,399 | 5/1919 | Ryan | 61—72.2 |
| 1,340,836 | 5/1920 | Powell | 61—72.2 |
| 2,718,684 | 9/1955 | Bjorksten | 61—72.2 X |
| 3,230,722 | 1/1966 | Coulter et al. | 61—72.2 |

FOREIGN PATENTS 760,419   12/1933   France.

EARL J. WITMER, *Primary Examiner.*